F. J. ANDERSON.
FLY TRAP.
APPLICATION FILED SEPT. 18, 1915.
1,169,227.
Patented Jan. 25, 1916.
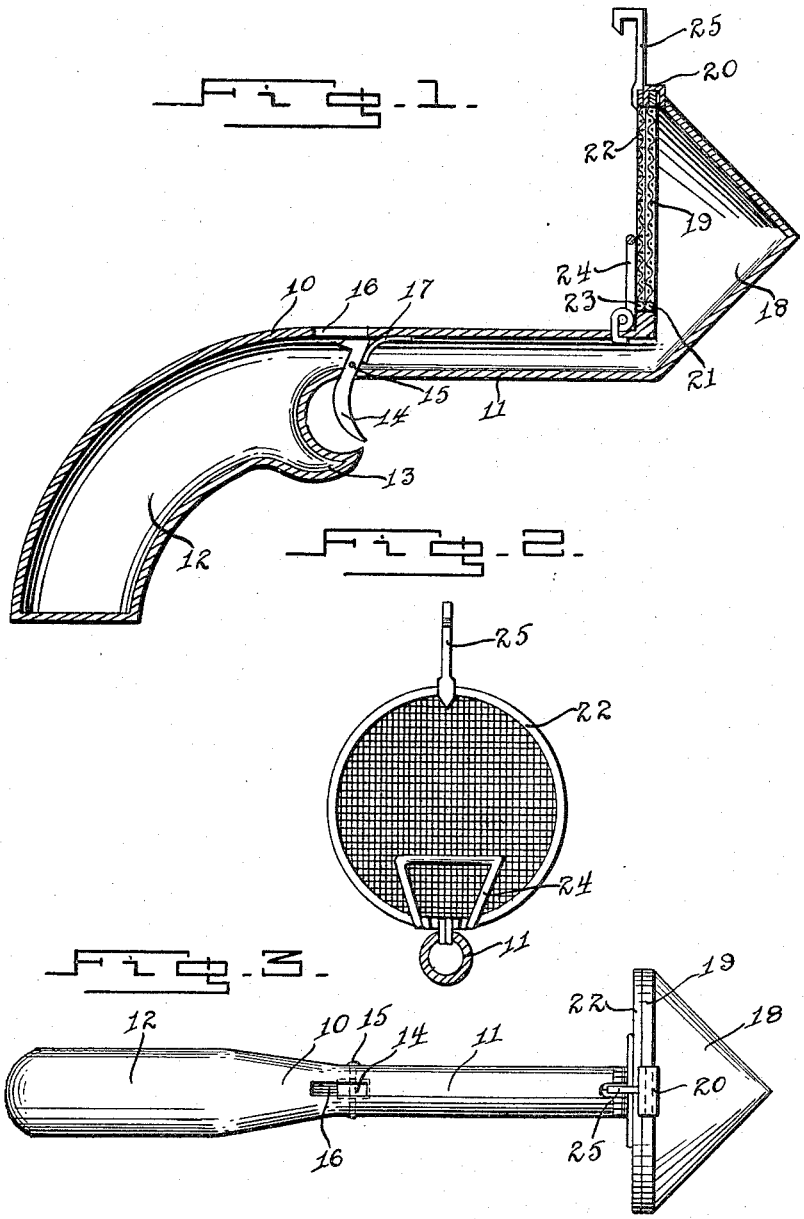
WITNESSES
Francis Ph. O'Reilly
Ross J. Woodward
INVENTOR
Frank J. Anderson,
BY Richard Owen.
ATTORNEY

UNITED STATES PATENT OFFICE.

FRANK J. ANDERSON, OF BOX ELDER, MONTANA.

FLY-TRAP.

1,169,227. Specification of Letters Patent. Patented Jan. 25, 1916.

Application filed September 18, 1915. Serial No. 51,378.

*To all whom it may concern:*

Be it known that I, FRANK J. ANDERSON, a citizen of the United States, residing at Box Elder, in the county of Hill and State of Montana, have invented certain new and useful Improvements in Fly-Traps, of which the following is a specification.

This invention relates to an improved fly trap which could be classed as a toy and is so constructed that it resembles a pistol, a spring controlled striking element being provided for killing flies against a guard plate positioned in front of the bait house.

This device is so constructed that the flies cannot reach the bait and therefore the bait will not be consumed.

This trap is also so constructed that it will constitute a novelty and therefore afford amusement as well as serving to exterminate flies.

This invention is illustrated in the accompanying drawings, wherein:—

Figure 1 is a view showing the improved trap in longitudinal section. Fig. 2 is a view taken along the line 2—2 of Fig. 1 and showing the barrel of the gun in cross section and the remainder in elevation. Fig. 3 is a view showing the trap in top plan.

The gun 10 which constitutes the handle or body portion of this trap is provided with a barrel 11 and stock 12 and is also provided with an extension forming a guard 13 for the trigger 14. This trigger 14 is pivotally mounted in the barrel by means of the pin 15 and is yieldably held in the normal position beneath the opening 16 by means of the spring 17.

The bait housing 18 which is conical in shape extends above the barrel as shown in Fig. 1 and has its open end face closed by the screen closure 19 which closure is releasably held in engagement with the housing by means of the clips 20. This closure is preferably hingedly connected with the lower end portion of the housing as shown at 21 and therefore it will be easy to open the housing to put bait into the same. A fly can therefore light upon the screen closure 19 and while it may be able to reach a portion of the bait placed in the housing it will be kept from reaching the major portion thereof.

The striking element or swatter 22 is hingedly mounted as shown at 23 and is yieldably held in engagement with the screen closure by means of the spring 24. Therefore when the striking element is released the spring 24 will return it to the position shown in Fig. 1 and cause it to strike a fly resting upon the closure 19 and kill the fly.

When this device is in use the bait is placed in the housing or receptacle 18 and the striking element then moved upon its hinge to extend along the barrel with the catch 25 extending through the opening 16 and engaged by the hooked end of trigger 14. As soon as a fly lights upon the screen closure 19 the trigger will be pulled thus releasing the striking element and permitting it to return to the normal position and kill the fly.

I have therefore provided a fly killing device which will afford amusement to the operator as well as serving a good purpose in exterminating flies.

It will be further noted that this device is so constructed that it may be easily cleaned and new bait placed in the receptacle.

What is claimed is:—

1. A fly trap including a hollow handle, a bait receptacle at the outer end of said handle having an open rear face, a perforated closure for said receptacle, a striking element hingedly mounted adjacent said closure, resilient means yieldably holding said striking element in engagement with said closure, a trigger mounted in said hollow handle beneath an opening formed therein and yieldably held in a set position, and a catch carried by said striking element and passing through the opening of the handle to engage said trigger when said striking element is moved to extend along said handle.

2. A fly killing machine comprising a handle, a bait receptacle carried by said handle and provided with an open face, a perforated closure for the open face of said receptacle, a striking element hingedly connected with said handle adjacent said closure and yieldably held in engagement therewith, a catch carried by said striking element, and a trigger carried by said handle and yieldably held in a position for engaging said catch when said striking element is moved to extend along said handle.

3. A fly killing device comprising a handle, a conical receptacle carried by said handle, a perforated closure for said receptacle, a striking element movably mounted adjacent said receptacle and yieldably held in engagement with said closure, a trigger carried by said handle, and means carried by said striking element for engaging said trigger to releasably hold said striking element out of engagement with said closure.

4. A fly killing device comprising a body portion, a bait receptacle provided with a perforated closure, a striking element movably mounted and held in engagement with said closure, and means for releasably holding said striking element out of engagement with said closure.

5. A fly killing device comprising a body portion, a bait receptacle carried by said body portion, a perforated closure for said receptacle, means for releasably holding said closure in a closed position, a movably mounted striking element yieldably held in engagement with said closure, and means for releasably holding said striking element out of engagement with said closure.

6. A fly killing device comprising a body portion, a bait receptacle provided with a perforated closure, a movably mounted striking element, and means for moving said striking element into engagement with said closure.

In testimony whereof I affix my signature in presence of two witnesses.

FRANK J. ANDERSON.

Witnesses:
JAMES A. BIRD,
CLYDE J. ABBEY.

Copies of this patent may be obtained for five cents each, by addressing the "Commissioner of Patents, Washington, D. C."